United States Patent
Mannava et al.

(10) Patent No.: US 8,463,958 B2
(45) Date of Patent: Jun. 11, 2013

(54) DYNAMIC RESOURCE ALLOCATION FOR TRANSACTION REQUESTS ISSUED BY INITIATOR DEVICES TO RECIPIENT DEVICES

(75) Inventors: Phanindra Kumar Mannava, Austin, TX (US); Jamshed Jalal, Austin, TX (US); Ramamoorthy Guru Prasadh, Austin, TX (US); Michael Alan Filippo, Driftwood, TX (US); Bruce James Mathewson, Papworth Everard (GB); Timothy Charles Mace, Haverhill (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/137,363

(22) Filed: Aug. 8, 2011

(65) Prior Publication Data

US 2013/0042032 A1 Feb. 14, 2013

(51) Int. Cl.
*G06F 3/00* (2006.01)
*G06F 5/00* (2006.01)

(52) U.S. Cl.
USPC .......................................... 710/52; 711/118

(58) Field of Classification Search
None
See application file for complete search history.

(56) References Cited

U.S. PATENT DOCUMENTS

| 7,047,322 | B1 * | 5/2006 | Bauman et al. | 710/6 |
| 7,127,534 | B2 * | 10/2006 | Jackson et al. | 710/52 |
| 7,213,087 | B1 | 5/2007 | Bertone et al. | |
| 7,603,502 | B2 * | 10/2009 | Richter et al. | 710/200 |
| 7,603,672 | B1 * | 10/2009 | Andrighetti | 718/103 |
| 2007/0038703 | A1 * | 2/2007 | Tendjoukian et al. | 709/206 |
| 2009/0187700 | A1 * | 7/2009 | Kern et al. | 711/103 |
| 2009/0327828 | A1 * | 12/2009 | Ojala et al. | 714/749 |
| 2011/0216712 | A1 * | 9/2011 | Yang et al. | 370/329 |

OTHER PUBLICATIONS

Great Britain Search Report, Nov. 21, 2012, in Great Britain Application No. GB1211699.2.

* cited by examiner

*Primary Examiner* — Elias Mamo
(74) *Attorney, Agent, or Firm* — Nixon & Vanderhye P.C.

(57) ABSTRACT

Initiator devices for generating transaction requests and recipient devices for receiving them are disclosed. The recipient devices accept transaction requests where there is available buffer storage for the transaction request. If there is no storage space available an acknowledgement signal generator generates and outputs a reject acknowledgement signal indicating a request has been received but has not been accepted by the recipient device. A credit generator can reserve at least one available storage location in the buffer and generate a credit grant for an initiator device that sent one of the transaction requests that was not accepted by the recipient device. The credit grant indicates to the initiator device that there is at least one reserved storage location, such that a subsequent transaction request from the initiator device will be accepted by the recipient device. Thus, the initiator device may not transmit the transaction request again until it has received the credit grant, whereupon it may transmit it along with a credit grant indicator such that it is sure that it will be accepted.

11 Claims, 6 Drawing Sheets

DYNAMIC RESOURCE ALLOCATION FOR TRANSACTION REQUESTS ISSUED BY INITIATOR DEVICES TO RECIPIENT DEVICES

TECHNICAL FIELD

The technical field relates to data processing systems, and in particular, to systems having a number of initiator devices issuing transaction requests to a number of recipient devices and to the allocation of resources within the recipient devices for executing these transaction requests.

BACKGROUND

Resource allocation for a plurality of initiator devices accessing a plurality of recipient devices in, for example, distributed shared memory needs to be carefully managed to ensure forward progress of each type of transaction request. This has been done in a variety of ways, but generally by the use of implicit or explicit resource allocation.

Implicit resource allocation has been done using acknowledgement signals sent from the recipient device and indicating to the initiator device whether the transaction request has been accepted or not. If it has not been accepted then the initiator device will reissue the transaction request later in the hope that this time it will be accepted.

A disadvantage of this is that it is difficult to bound the latency for each transaction request as one can continually try and not succeed. Furthermore, the continual trying has an overhead of time, power and bandwidth associated with it.

An alternative system is one where at start up for example, each initiator device is given a certain number of credits for transactions with a recipient device and as a credit is used, a new one is issued once the transaction request that used it has completed. A drawback of this is that as systems become larger, in order to provide all initiators with credits for each recipient, the buffers for storing pending transactions on the recipients need to become larger and larger.

It would be desirable to be able to dynamically allocate resources in such a way that efficient use is made of the transaction request storage and yet latency of individual transaction requests is kept low.

SUMMARY OF THE INVENTION

A first aspect of the technology described herein provides a recipient device for receiving transaction requests from a plurality of initiator devices via at least one interconnect, said recipient device comprising: at least one port for receiving said transaction requests from and for issuing requests and signals to said at least one interconnect; an acknowledgement signal generator configured to generate and output a reject acknowledgement signal indicating a request has been received but has not been accepted by said recipient device; a buffer for storing accepted and pending transaction requests prior to execution by said recipient device; a credit generator, said credit generator being configured: to reserve at least one available storage location in said buffer; and to generate a credit grant for an initiator device that sent one of said transaction requests that was not accepted by said recipient device, said credit grant indicating to said initiator device that there is at least one reserved storage location, such that a subsequent transaction request from said initiator device will be accepted by said recipient device.

The inventors recognized the competing problems associated with keeping transaction request storage on recipient devices low to reduce area overhead without unduly increasing the latency of some transaction requests that may be continually refused by a recipient device that has no space to store the transaction request. It addresses this problem by providing a recipient device that when storage locations for pending transaction requests become available reserves a storage location and transmits a credit grant to an initiator that has had a transaction request refused. The initiator device can then reissue this transaction request and be guaranteed that it will be accepted.

In this way the recipient device itself has knowledge of which initiator devices have pending transaction requests that have been refused and it can transmit a credit to a selected one as storage locations in the buffer of the recipient device become available, having first reserved them so that they can only be used by initiator devices that have received a credit grant. In this way the initiator device can be sure that a transaction request sent in response to a credit grant will be accepted. This provides a relatively simple yet efficient way of allocating the resources of the recipient device, that both ensures that at a certain point a transaction request will be accepted and yet does not require a large buffer in the recipient device.

In some embodiments, said recipient device is configured to accept a transaction request comprising an indicator indicating that a credit grant received by said initiator transmitting said transaction request is being used and to store said transaction request in one of said at least one reserved storage locations.

The recipient device can determine when a transaction request is being sent by an initiator device that has received a credit grant by an indicator associated with the transaction request that indicates this. In response to such a transaction request the recipient device can accept the transaction request knowing that there is a reserved storage location available, and in this way a transaction request with a credit grant indicator is always accepted by the recipient device. As the information about the credit grant is transmitted along with the transaction request the recipient device does not need to store information regarding transaction requests that have not been accepted earlier and this reduces the storage requirements of the recipient device.

In some embodiments, said credit generator comprises a counter for storing a count of a number of reserved available storage locations, said credit generator being configured to increment said count value in response to determining one of said storage locations becoming available and to decrement said count value in response to receiving a transaction request comprising an indicator indicating that a received credit grant is being used.

When issuing a credit grant for a refused transaction request a storage location in the buffer is reserved so that when a transaction request with an associated credit grant indicator is received it can be guaranteed to be accepted. Rather than reserving a particular storage location for a particular transaction request the credit generator simply increments a count value that indicates a number of storage locations within the buffer that are reserved for transaction requests that have credit grants associated with them. In this way by simply storing a count value the credit generator knows how many storage locations are reserved for transaction requests that have credit grants and how many storage locations are available for other transaction requests. In this regard it may determine the latter by having a further counter counting free storage locations that is decremented when a transaction request is stored to the buffer and incremented when a transaction request is evicted from the buffer.

In some embodiments, said credit generator further comprises a plurality of counters corresponding to said plurality of initiator devices each for storing a count value indicative of a number of pending transaction requests received from said respective plurality of initiator devices that have not been accepted by said recipient device, said credit generator being configured to increment one of said counters in response to said recipient device receiving and not accepting at least some of said transaction requests from said corresponding initiator device and to decrement one of said counters in response to receiving a transaction request comprising an indicator indicating that a received credit grant is being used from said corresponding initiator device.

As noted previously the recipient device does not need to store details of individual transaction requests that are not accepted. In some embodiments it has a number of counters that correspond to the number of initiator devices and these store a count value indicating the number of transaction requests that the recipient device has received and not accepted from each initiator device. Storing this information allows the recipient device to know which initiator devices have a lot of transaction requests that are pending and have been refused by the recipient device. It can then use this information when selecting which initiator device to issue credit grants to. Once again the information is stored in an area efficient manner.

In some embodiments, said credit generator is configured to increment one of said counters in response to all of said transaction requests that are received and not accepted by said recipient device. While in other embodiments, said credit generator is configured to increment one of said counters only in response to said transaction requests that are received and not accepted by said recipient device and that comprise a credit granting indicator.

It may be that for each transaction request that is not accepted by the recipient device the recipient device will increment a counter indicating that it has been refused and will later transmit a credit grant to that initiator device. In this case after a first refusal of a transaction request an initiator device will not issue the transaction request again until a credit grant has been received. Alternatively, it may be that the system is devised so that a transaction request is sent a certain number of times before it waits for a credit grant. In the latter case in order for the recipient device to know whether the transaction request will be sent again or whether it is awaiting a credit grant the transaction request will have a credit granting indicator associated with it when it has been sent the requisite number of times. In response to this indicator the recipient device will increment one of the counters corresponding to the initiator device that sent the transaction request and this will indicate to the recipient device that the initiator device is awaiting a credit grant.

The advantage of only sending a transaction request once and then waiting for a credit is that one does not need to track how many times a transaction request has been issued and not accepted and there is no requirement for an indicator on the transaction request indicating that it requires a credit grant. However, it may be that in certain circumstances it is very likely that a transaction request will be accepted a second or third time and thus, only sending the transaction request once before requesting and awaiting a credit grant with the corresponding reservation of storage locations is an unnecessary overhead. In such a case setting the number of times that a transaction request is refused before it requests a grant to be a particular number can improve the efficiency of the system. Clearly it depends on operating conditions and the functionality of the initiator device and recipient device and thus, in some embodiments the values can be set accordingly.

In some embodiments, said credit generator comprises prioritisation logic for prioritising said pending transaction requests that were not accepted by said recipient device, said prioritisation logic being configured to select said one of said initiator devices to transmit said credit grant to in dependence upon a prioritisation algorithm and upon count values of said counters.

In order to ensure that the recipient devices resource's are allocated fairly to the initiator devices and that no initiator device has to wait too long for a transaction request to be accepted, prioritisation logic can be used that has a prioritisation algorithm that selects an initiator device for a next credit grant. This prioritisation algorithm may use the count values of the counters that indicate to it how many transaction requests each initiator device has had refused.

In some embodiments, said credit generator is responsive to a credit refuse request received at said at least one port indicating that a credit grant that has been generated and output to one of said initiator devices is not required by said initiator device, to make one of said reserved storage locations available and to decrement said counter related to said one of said initiator devices.

It may be advantageous if the recipient device can be responsive to credit refuse requests to make a reserve storage location available and to decrement the counter related to the initiator device that sends the credit refuse requests. In some cases a credit grant may be issued to an initiator device that will not reissue the transaction request. This may occur where a transaction request was issued speculatively and was not accepted by the recipient device and triggered the credit grant. This speculative issue of the transaction request will not be repeated and thus, the credit grant is not required by the initiator device. Rather than having a storage location reserved permanently for this initiator device that does not require it, it is advantageous if the initiator device can transmit a credit refuse signal to indicate to the recipient device that the reserved storage location is not required so that it can be freed to store another pending transaction request.

In some embodiments, said credit generator is responsive to a credit grant demand received at said at least one port from an initiator device, to determine when a storage location becomes available in said buffer and to reserve an available storage location, and to generate and output a credit grant to said initiator device.

It may also be advantageous if the recipient device can be responsive to a credit grant demand to issue a credit grant to an initiator device. Initiator devices may be able to determine when they are to enter periods of operations where they require access to a recipient device. In such a case it may be advantageous if they can request credit grants in advance so that when later accessing the recipient device the transaction requests are guaranteed to be accepted and the performance of the system is improved.

A second aspect of the technology described herein provides an initiator device for issuing transaction requests to a plurality of recipient devices via at least one interconnect, said initiator device comprising: at least one port for receiving requests and signals from and issuing transaction requests to said at least one interconnect; said initiator device comprises transaction request issuing circuitry for issuing said transaction requests to a respective one of said plurality of recipient devices and for receiving acknowledgement signals indicating when said issued transaction requests have not been accepted by said respective recipient device, said transaction request issuing circuitry being configured to respond to receipt of at least one acknowledgement signal indicating that one of said issued transaction requests has not been accepted by said respective recipient device, to not issue said one of said issued transaction requests again until after receipt of a credit grant from said respective recipient device, said credit grant indicating said respective recipient device will accept a subsequent transaction request from said initiator device.

The technology described herein provides an initiator device that in response to receiving an acknowledgement signal from a recipient device indicating that a transaction request has not been accepted, will not reissue the transaction request until after a credit grant has been received from the respective recipient device. The credit grant indicates to the initiator device that a subsequent transaction request will be accepted by the recipient device. In this way rather than continually issuing a transaction request that may continually be refused, the initiator device simply awaits receipt of the credit grant whereupon it knows that the transaction request will be accepted and it can issue it again. In this way acceptance of a transaction request is guaranteed and a long latency for a particular transaction request that is continually refused is avoided. Furthermore, by avoiding the continual resending of transaction requests and their continual refusal power consumption and interconnect bandwidth can be reduced.

In some embodiments, said transaction request issuing circuitry is responsive to each acknowledgement signal indicating that one of said issued transaction requests has not been accepted by said respective recipient device not to issue said one of said transaction requests again until after receipt of a credit grant from said respective recipient device.

The initiator device may respond to each acknowledgement signal indicating that a transaction request has not been accepted to not issue it again and to await a credit grant. Alternatively, the initiator device may comprise a counter that will track a number of times a transaction request is not accepted and, the initiator device will only not issue a transaction request again after it has not been accepted a certain number of times.

It may be advantageous to speculatively try to issue a transaction request a number of times as it may be very likely that it will be accepted. However, in order to avoid it being continually refused it may be advantageous to track the number of times it is refused and after a certain number request a credit grant. As the number of times is tracked at the initiator device by the counter, the information that this transaction request has been refused predetermined number of times and requires a credit grant can be transmitted to the recipient device by attaching a credit grant indicator to the transaction request once it has been refused that certain number of times. This allows the initiator device to be sure that the transaction request will only be refused a certain number of times and that after this it will be accepted when issued again in response to receipt of the credit grant.

In some embodiments, said transaction request issuing circuitry is configured to change said predetermined value in response to detected operating conditions of said initiator device.

The preferred value for the number of times to reissue the transaction request depends on the operating conditions of the initiator device and recipient device and may change during processing. Thus, it may be advantageous if this predetermined value can be varied. Many initiator devices access recipient devices in a bursty manner such that at certain times they access them infrequently while at others they may access them very frequently. If the access patterns are of this sort then the optimum predetermined value will change with the access patterns and thus, being able to change this value during operation enables the system to be tuned to operate more efficiently.

In some embodiments, said transaction request issuing circuitry is configured to issue a credit refuse request in response to receipt of a credit grant received in response to an issued transaction request that was not accepted by said respective recipient device and that said initiator device will not reissue.

It may be that an initiator device issues a transaction request that is not accepted by the recipient device but that the initiator device is not interested in issuing again. For example, it may be a speculative data access. In such a case if a credit is issued to the initiator device the initiator device does not require this credit grant and it is convenient if it can issue a credit refuse request such that the storage location reserved in the recipient device for that credit grant can be released.

In some embodiments, the transaction request issuing circuitry comprises a credit grant demand generator for generating at least one credit grant demand and for issuing said credit grant demand to one of said plurality of recipient devices, said credit grant demand triggering said one of said recipient devices to issue a credit grant to said initiator device, such that a subsequent transaction request issued from said initiator device to said one of said recipient devices will be accepted.

It may be convenient if the initiator device has a credit grant demand generator that can demand a credit grant in advance of a transaction request. There may be some periods of operation where the initiator device will need to access the recipient device frequently and these periods of operations may be ones where low latency is important. In such a case being able to request credit grants in advance will improve the performance of the initiator device.

In some embodiments, said transaction request issuing circuitry is configured to select a transaction request to issue to said respective recipient device in response to receipt of said credit grant and to append an indicator indicating said credit grant is being used to said selected transaction request prior to issuing it.

When a credit grant is received by the initiator device, the initiator device does not need to use it for the transaction request that was not accepted and in effect triggered this credit grant. The initiator device can select according to its own prioritisation logic a pending transaction request that is perhaps more critical to performance than the refused transaction request and can issue this with an indicator indicating that a credit grant has been received which will ensure that this transaction request is accepted. In this way the initiator device can prioritise performance critical transaction requests and the recipient device can track which credit grants have been used simply by monitoring the indicators associated with the transaction requests.

A third aspect of the technology described herein provides a data processing apparatus comprising a plurality of initiator devices, plurality of recipient devices and at least one interconnect connecting said plurality of initiator devices to said plurality of recipient devices, at least one of said initiator device being an initiator device according to the second aspect and at least one of said recipient devices being a recipient device according to the first aspect.

A fourth aspect of the technology described herein provides a method of determining which transaction requests to accept at a recipient device receiving transaction requests issued by a plurality of initiator devices comprising: receiving said transaction requests; generating reject acknowledgement signals for transaction requests that are received but not accepted by said recipient device; storing accepted and pending transaction requests in a buffer prior to execution by said recipient device; reserving at least one available storage location in said buffer; generating a credit grant for an initiator device that sent one of said transaction requests that was not accepted by said recipient device; outputting said credit grant to said initiator device indicating that there is a reserved storage location, such that a subsequent transaction request from said initiator device will be accepted by said recipient device.

A fifth aspect of the technology described herein provides a method of issuing transaction requests to a plurality of recipient devices, said method comprising: issuing one of said transaction requests to a respective one of said plurality of recipient devices; receiving an acknowledgement signal from said respective recipient device indicating when said issued transaction request has not been accepted by said respective recipient device; in response to at least one acknowledgement signal indicating that one of said issued transaction requests has not been accepted by said respective recipient device not issuing said transaction request again until after receipt of a credit grant from said respective recipient device, said credit grant indicating said respective recipient device will accept a subsequent transaction request from said initiator device.

A sixth aspect of the technology described herein provides a recipient means for receiving transaction requests from a plurality of initiator means via at least one interconnect, said recipient means comprising: at least one port means for receiving said transaction requests from and for issuing requests and signals to said at least one interconnect; an acknowledgement signal generating means for generating and outputting a reject acknowledgement signal indicating a request has been received but has not been accepted by said recipient means; a storage means for storing accepted and pending transaction requests prior to execution by said recipient device; a credit generating means for reserving at least one available storage location in said storage means, and for generating a credit grant for an initiator means that sent one of said transaction requests that was not accepted by said recipient means, said credit grant indicating to said initiator means that there is at least one reserved storage location, such that a subsequent transaction request from said initiator means will be accepted by said recipient means.

A seventh aspect of the technology described herein provides an initiator means for issuing transaction requests to a plurality of recipient means via at least one interconnect, said initiator means comprising: at least one port means for receiving requests and signals from and issuing transaction requests to said at least one interconnect; said initiator means comprises transaction request issuing means for issuing said transaction requests to a respective one of said plurality of recipient means and for receiving acknowledgement signals from said interconnect indicating when said issued transaction requests have not been accepted by said respective recipient means, and for not issuing said transaction request again in response to at least one acknowledgement signal indicating that said transaction request has not been accepted by said respective recipient means until after receipt of a credit grant from said respective recipient means, said credit grant indicating said respective recipient means will accept a subsequent transaction request from said initiator means.

The above, and other objects, features and advantages will be apparent from the following detailed description of illustrative embodiments which is to be read in connection with the accompanying drawings.

DESCRIPTION OF EXAMPLE, NON-LIMITING EMBODIMENTS

Figure 1:
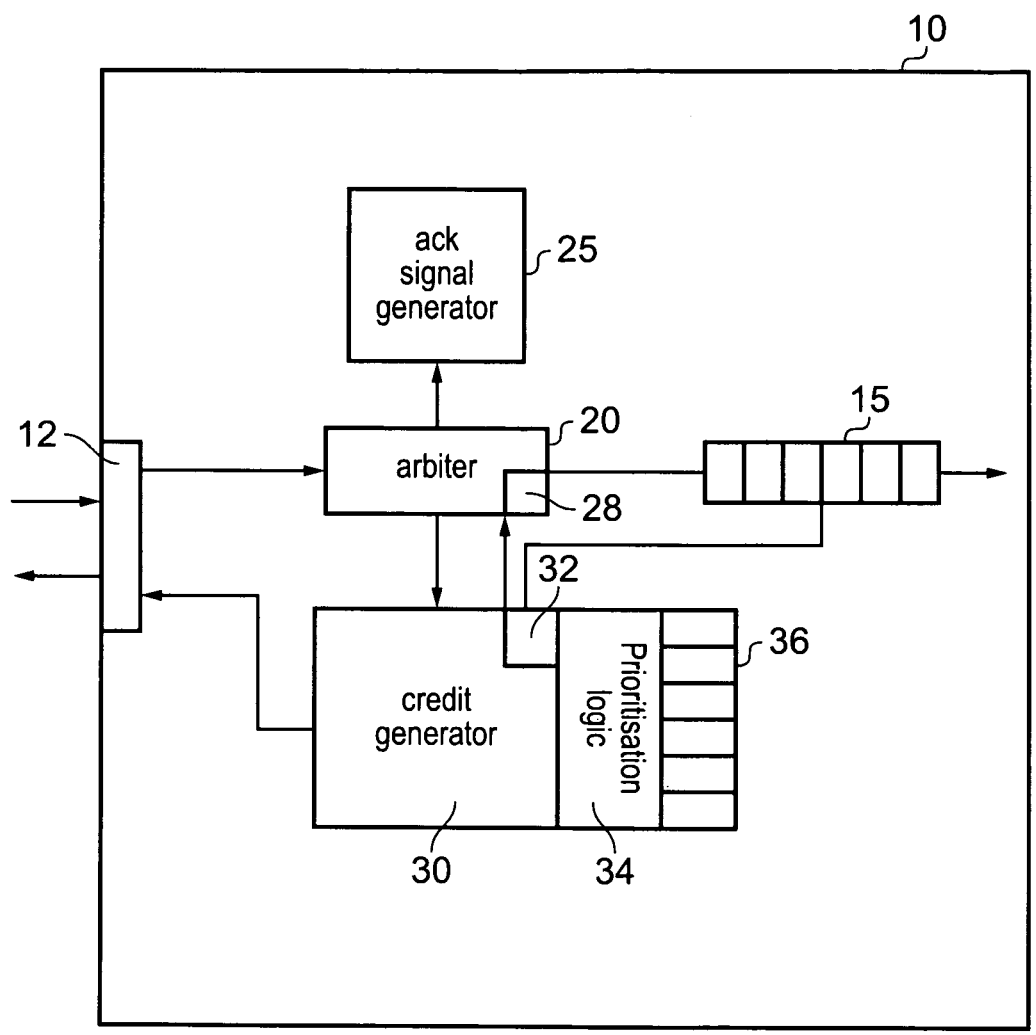
FIG. 1 shows a recipient device according to an example, non-limiting embodiment.

FIG. 1 shows a recipient device 10 according to an example, non-limiting embodiment. This recipient device may typically be a slave in a system such as, a coherency controller or an input/output bridge.

This recipient device receives transaction requests at port 12 from initiator devices sent over an interconnect. Recipient device 10 comprises a buffer 15 for storing pending transaction requests that have been received prior to them being executed by the recipient device. Thus, in response to receipt of a transaction request the recipient device 10 will accept the transaction request and store it in buffer 15 provided there is a storage location available. Whether or not there is a storage location available is determined by arbiter 20.

The pending transaction requests are stored in buffer 15 until the recipient device can execute them, whereupon the transaction request is evicted from buffer 15. Once the recipient device has executed a pending transaction request then a completed acknowledge system is sent back to the initiator device.

There is a counter 28 associated with arbiter 20 that counts the number of available storage locations and arbiter 20 determines the availability of storage locations from this counter When a received transaction request is stored in buffer 15, then counter 28 is decremented, while when a transaction request is evicted from buffer 15 the counter is incremented.

If the arbiter 20 determines that there is no available space in buffer 15 then the transaction request cannot be accepted by recipient device 10 and it is refused. Arbiter 20 signals this refusal to the acknowledge signal generator 25 which transmits a signal via port 12 back to the initiator device that sent the transaction request indicating that the transaction request has not been accepted.

If the transaction request had a credit grant demand associated with it then arbiter 20 signals to credit generator 30 that a credit is required and the credit generator 30 increments the counter 32 that pertains to the initiator device that sent the transaction request and this increment in the counter indicates to the credit generator that a credit is required for that initiator device. It should be noted that in some embodiments all refused transaction requests will trigger credit generator 30 to increment one of the counters 32 and in the fullness of time send a credit. In other embodiments, it is only those transaction requests that are received that have a credit grant demand associated with them that trigger this behaviour. It should also be noted that the counters 32 must be sized to a suitable size that they can count all pending refused transaction requests that are awaiting a credit grant for each initiator device.

Credit generator 30 monitors to determine when there are available storage locations. It may do this by monitoring counter 28. When credit generator 30 has pending refused transaction requests, that is when at least one of the counters 32 is not 0, it will reserve an available storage location when it detects one and prioritisation logic 34 within the credit generator 30 will determine which of the initiator devices that have pending refused transaction requests should receive this credit. It will then generate such a credit and transmit it to the initiator device. It will also decrement the counter 32 associated with the initiator device to which it has sent a credit. To reserve the credit, credit generator 30 increments counter 36 which indicates the number of reserved storage locations. Counter 28 may count the total number of available storage locations, that is those that are reserved and those that are free and not reserved, or it may count just the non-reserved free storage locations.

Prioritisation logic 34 may use one of several algorithms to select a particular initiator device. When selecting an initiator device it will take account of the values of the counters 32. If an initiator device has many transaction requests that have been refused and are pending then it will generally have greater priority than those that have fewer. In some cases all count values may be zero in which case the credit generator will not reserve any storage locations but will wait for the count value to increment before reserving an available storage location and issuing a credit.

In general the prioritisation for allocation of a reserved buffer storage location should be done in a fair manner taking into account all the pending refused transaction requests that are awaiting a credit and in some embodiments their quality of service QOS requirements.

In systems where QOS prioritization is required, credit grant tracking should also track the QOS value of the request that was retried, thus, at least one QOS value pertaining to the initiator device should be stored along with the counter for that device. In such systems a QOS value will be associated with a transaction request and this can be stored in conjunction with the counter. Where only one QOS is stored per initiator device, the value for the most recently refused transaction request can be stored. When a credit is granted this QOS value can be reduced in value or deleted. Selection of the next initiator device to receive a credit grant should take into account QOS value priorities. The system should also implement a starvation prevention mechanism to prevent lower priority requests from starving, that is never receiving a credit.

The arbitration to pick the next credit grant to allocate can be done in two levels. First pick based on the highest QOS value and next one pick the request among same QOS values in a round robin manner.

In addition to receiving transaction requests the recipient device 10 may receive a credit grant request from an initiator device. This may occur where the initiator device recognises that it is about to enter a mode of operation where it will require access to the recipient device and where the code executed is critical code that should execute with low latency. In such a case it is desirable if it can receive a credit from the recipient device 10 in advance such that when it issues its transaction request it is guaranteed to be accepted by the recipient device 10. In response to such a credit grant request credit generator 30 will issue a credit to the initiator device. It will also increment counter 36.

The recipient device 10 may also receive a credit refusal request from an initiator device. This may occur where an initiator device has received a credit for a pending refused transaction request that it does not wish to reissue. In such a case rather than retain the credit which will cause a storage location in buffer 15 to be reserved the initiator device may return the credit using the credit grant refuse signal and in response to this, the credit generator 30 will release a reserved storage location by decrementing counter 36.

By incrementing counter 36 when credits are granted and decrementing it when they are used or returned, the credit generator 30 can keep track of the number of reserved storage locations in an area efficient and straightforward manner and does not need to track which transaction requests have been refused and which triggered the reservation of which storage location.

Arbiter 20 reads counter value 36 and counter value 28 when determining whether there are storage locations free for a newly received transaction request. If a newly received transaction request has a credit indicator associated with it then it will be stored in the buffer 15 by arbiter 20 and counter 36 will be decremented. Similarly when a credit is granted, counter 36 is incremented. If counter 28 tracks storage locations that are free (reserved or not) as opposed to those that are free and not reserved, it will be updated along with counter 36, while if it only tracks free storage locations that are not reserved, then the allocation and freeing of reserved storage locations will not affect this counter value.

Figure 2:
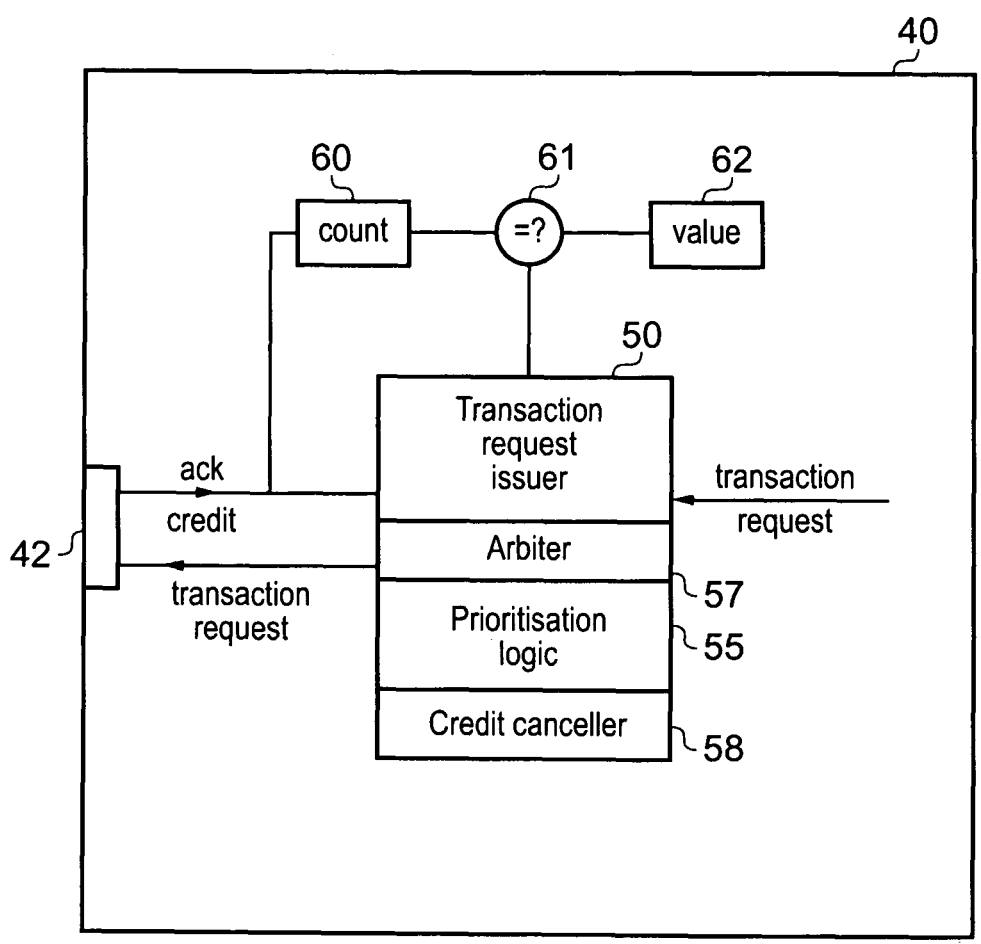
FIG. 2 shows an initiator device according to an example, non-limiting embodiment.

FIG. 2 shows an initiator device 40 according to an example, non-limiting embodiment. This initiator device may be a master such as a processor core. This initiator device 40 generates transaction requests and these are stored in a buffer within arbiter 57 prior to being issued by transaction request issuer 50 to a port 42. Transaction request issuer 50 has prioritisation logic 55 within it which arbiter 57 uses to select one of the pending transaction requests to be issued and a credit canceller 58.

The transaction request issuer 50 will issue transaction requests and these will be sent via port to an interconnect and then to a recipient device such as recipient device 10 shown in FIG. 1. If the transaction request is not accepted by the recipient device then an acknowledge signal indicating that the transaction request has been refused will be sent to the initiator device 40 and be received at port 42.

In response to this refused acknowledgement signal the count value of counter 60 will be incremented. Comparator 61 determines if the count value of counter 60 is equal to a predetermined value stored in data store 62. If it is not then the transaction request issuer will reissue this transaction request under control of arbiter 57. It may wait a predetermined time before reissuing it or it may reissue it almost immediately. If the count value is equal to the value stored in data store 62 then the transaction request issuer 50 will reissue the transaction request with a credit grant request indicator associated with it. It will then not reissue this transaction request again until it has received a credit from the recipient device.

When a credit is received from the recipient device the transaction request issuer can then issue the transaction request with a credit grant indicator that will ensure that it is accepted. It can however, decide using arbiter 57 and prioritisation logic 55 to issue a different transaction request to that which requested the credit. The selected transaction request that is issued will be issued with the credit grant indicator associated with it. This will guarantee that the recipient will accept the transaction request.

In this way prioritisation logic 55 can prioritise transaction requests and ensure that transaction requests that are critical to performance are prioritised and thus, their latency is reduced. When the transaction request is issued with the credit grant indicator then counter 60 is cleared. In some embodiments the initiator device might track the quality of service QOS value of pending transaction requests. This allows the prioritisation logic 55 to prioritise and select an appropriate transaction request to provide the credit grant to.

In this embodiment there is only a single counter shown however there may be several counters as the initiator device 40 may issue several transaction requests and a count for each may be kept such that each can request a credit grant at a certain point.

If a credit is issued to a transaction request other than the transaction request that triggered generation of the credit then this transaction request which was awaiting the credit can be reissued again without the credit grant. It can in some embodiments be reissued immediately with a credit request associated with it or it can be reissued without a credit grant and its counter set to zero, such that it is again reissued the number of times determined by the value in 62 prior to requesting a credit.

In some embodiments initiator device 40 does not have a counter 60 or a comparator 61 or a data store 62. In these embodiments each transaction request that is not accepted triggers the recipient device to generate a credit grant and each transaction request is only issued once and then awaits receipt of a credit.

In some embodiments the value stored in data store 62 may be changed in real time, such that as operating conditions change the number of times a transaction request is issued prior to it requesting a credit grant can also be changed. This enables a system to be tuned to the current operating conditions and may increase performance.

In this embodiment the transaction request issuer 50 also has a credit canceller 58 associated with it. This credit canceller may issue a credit cancel signal where the initiator device 40 has received a credit for a pending transaction request that it perhaps issued speculatively and does not wish to reissue. Rather than retaining the credit it is advantageous if the credit canceller 58 issues a credit cancel signal which is sent to the recipient device and acts to free up the storage location reserved for this particular credit.

Figure 3:
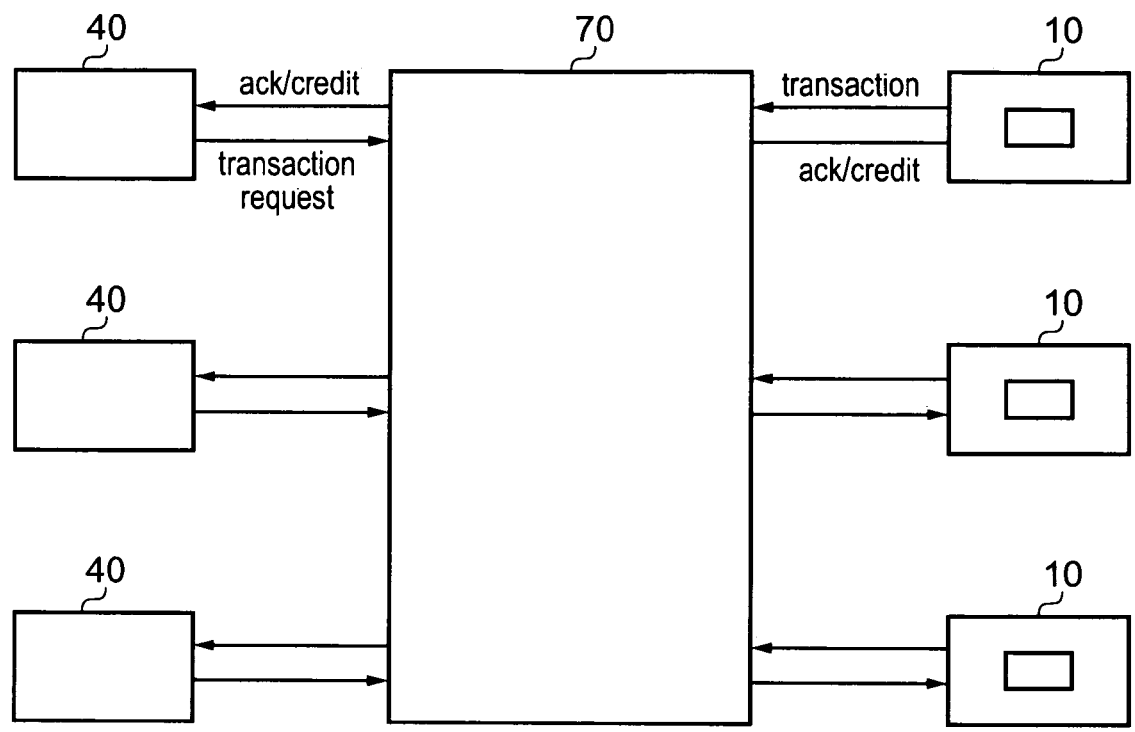
FIG. 3 shows a data processing system comprising several initiator devices and several recipient devices all interconnected by an interconnect.

FIG. 3 schematically shows a data processing system comprising a plurality of initiator devices 40 connected via interconnect 70 to a plurality of recipient devices 10. Each initiator device will send transaction requests via interconnect 70 to any one of the recipient devices 10. These devices will either accept the transaction request or will refuse them and if the latter will send an acknowledge signal indicating this. Credit signals may later be sent and in response to these transaction requests can be reissued via the interconnect with a credit indicator attached to them.

Figure 4:
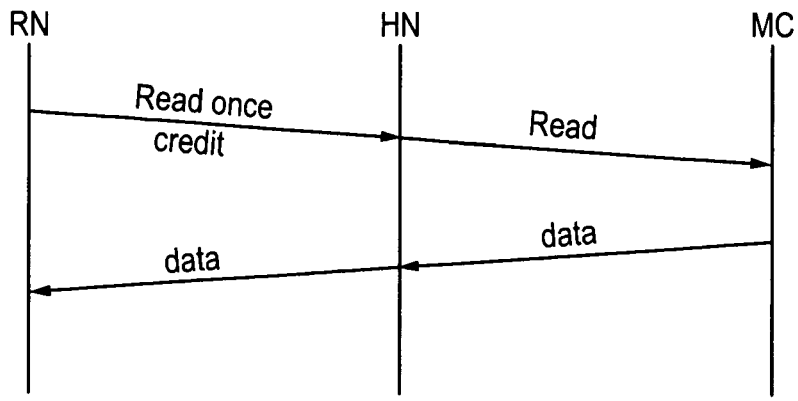
FIG. 4 schematically shows the progress of transaction requests in a data processing system according to an example, non-limiting embodiment.
Figure 4:
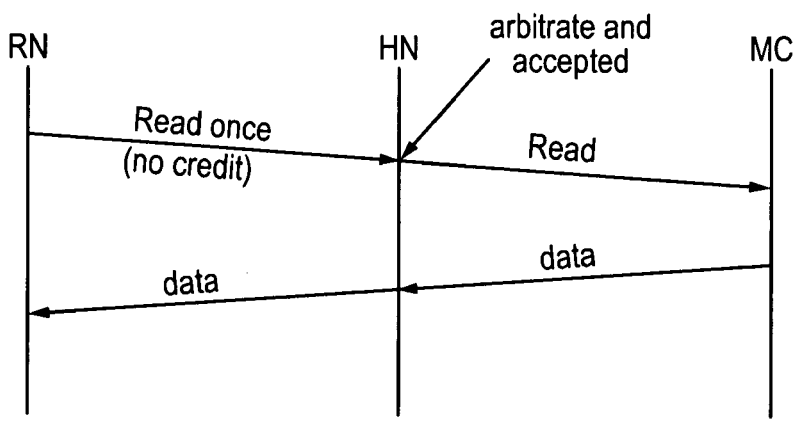
Figure 4:
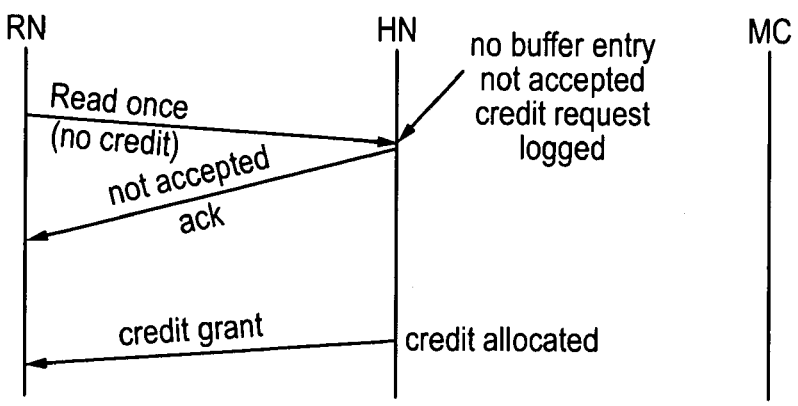

FIG. 4 shows very schematically how transaction requests from a requesting node that corresponds to the initiator device 40 of FIG. 2, are treated at a home node which corresponds to a destination or a recipient device such as is shown in FIG. 1, before being sent perhaps to a memory controller. In the first example, a read request is issued by the requester node with a credit attached to it. This is received at the home node and is stored in a reserved storage location in a buffer there. It is then executed by being sent to the memory controller and data is returned to the requesting node.

In the second example a similar read request is sent from the requesting node but in this case there is no credit attached to it. When it arrives at the home node there happens to be an available space in the buffer that is not reserved for a transaction request with a credit and thus, the read request is accepted and stored in the buffer until it is executed and sent on to the memory controller whereupon data is sent back to the original requesting node.

The third example is similar to the previous example however, in this case there is no space available in the buffer and thus, as the read request has not credit attached to it, it is not accepted at the home node and a negative acknowledge signal is sent back to the requesting node. The requesting node does not send the transaction request again until it has received a credit from the home node. Once it receives the credit then it can proceed as in the first example by sending the read request again with the credit attached to it.

Figure 5:
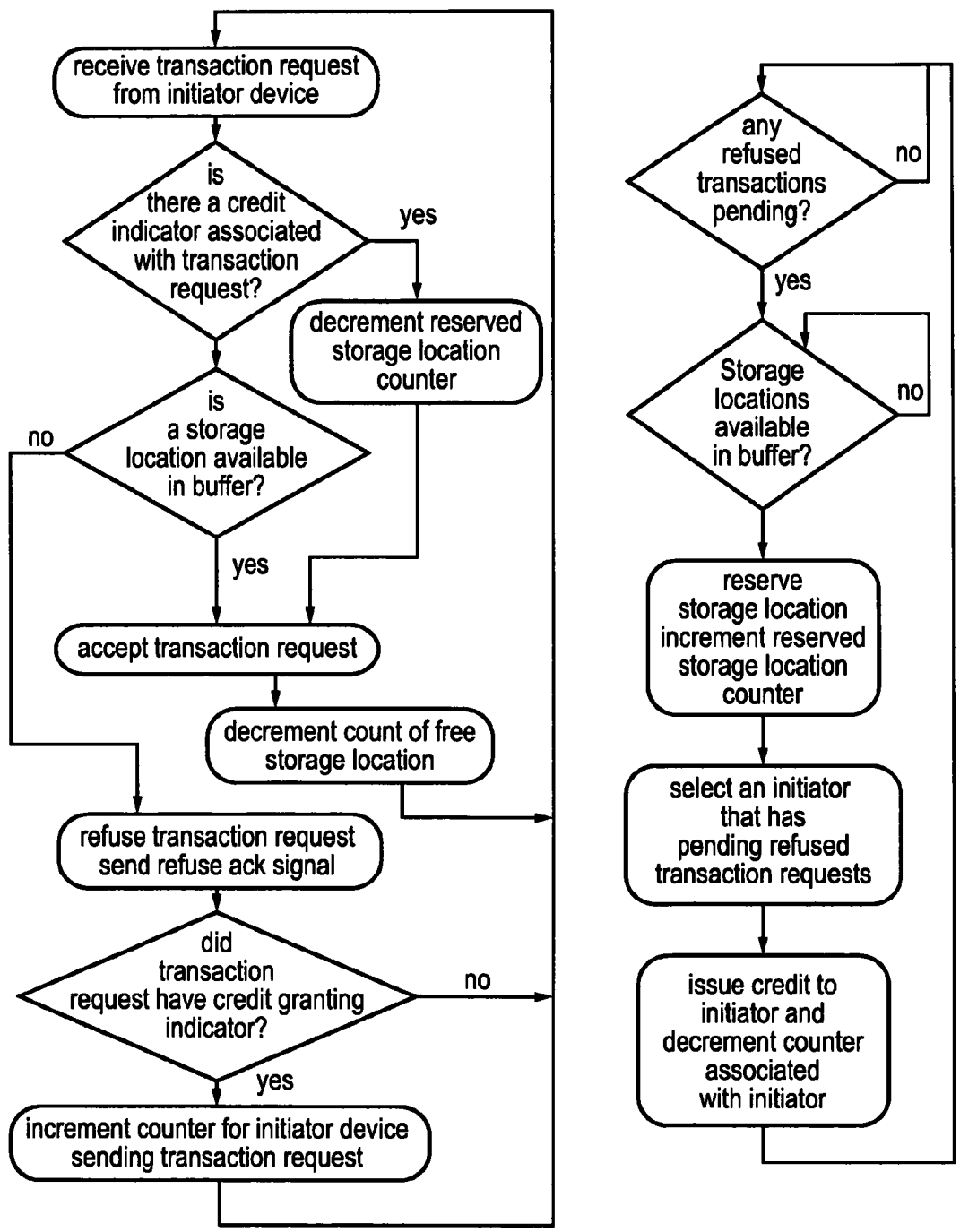
FIG. 5 shows a flow diagram illustrating steps in a method performed by a recipient device according to an example, non-limiting embodiment.

FIG. 5 shows a flow diagram illustrating steps in a method performed at a recipient device according to an example, non-limiting embodiment.

In this method a transaction request is received from an initiator device and the recipient determines if there is a credit indicator associated with it. If there is not then it determines if there is a storage location available in the buffer. If there is a storage location available then it will accept the transaction request and store it within the buffer. It will then decrement the counter counting the number of free storage locations and will receive a next transaction request.

If there was a credit indicator associated with the transaction request then the counter that indicates the number of reserved storage locations in the buffer will be decremented and the transaction request will be accepted and stored within the buffer. In this example the counter counting the number of free storage locations counts total free storage locations that is those that are reserved and those that are not reserved but are available and thus, this counter is also decremented at this point. In other embodiments the free storage location counter may only count non-reserved available locations in which case it will not be decremented at this point.

If the request did not have a credit indicator associated with it and there is no storage location available in the buffer then the transaction request will not be accepted and a refused acknowledge signal will be transmitted back to the initiator device. In this case the recipient will determine if the transaction request has a credit granting indicator associated with it. If it doesn't then it will perform no further actions for this transaction request. If it does have a credit granting indicator associated with it then it will increment the counter for the initiator device that sent that transaction request. This will trigger the grant of a credit for that initiator device in time. This is shown in the second section of FIG. 5.

The second section of the flow diagram of FIG. 5 shows how credits are granted. Thus, the credit generator determines are any refused transaction requests pending, it does this by determining if any of the counters associated with different initiator devices are non-zero. If there are any refused transaction requests pending then it determines if there is a storage location available in the buffer. If there is then it reserves the storage location which in this case is done by incrementing the reserved storage location counter.

The credit granter then selects an initiator which has a pending refused transaction request. It does this using prioritisation logic which selects the initiator device based on the number of refused transaction requests that are pending for a particular initiator device. It will then issue a credit to the initiator device that it has selected and it will decrement the counter associated with that initiator device such that it knows that there is one fewer pending refused transaction request for that initiator device that is awaiting a credit grant.

It will then determine if there are any further refused transaction requests pending and if there are it will once again look to see if there are storage locations available in the buffer.

Although not shown the credit granting generator may also receive a request for a credit and if this is the case it will also look to see if there is a storage location available in the buffer and when there is it will reserve the storage location and transmit the credit to the initiator.

It may also receive a signal indicating that a previously granted credit is no longer required. In such a case it will decrement the counter indicating the number of reserved storage locations.

Figure 6:
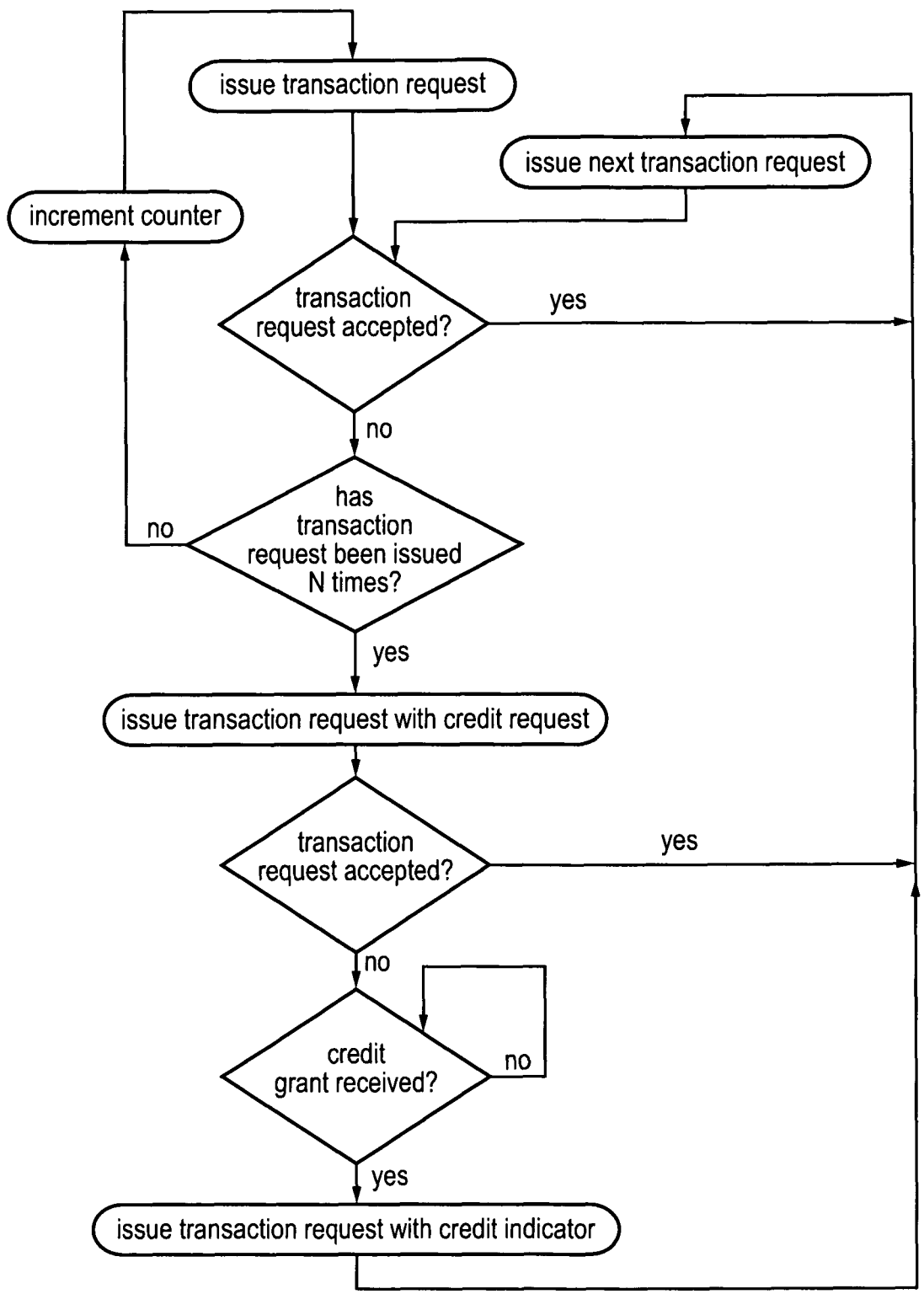
FIG. 6 shows a flow diagram illustrating steps in a method performed by an initiator device according to an example, non-limiting embodiment.

FIG. 6 shows a flow diagram illustrating steps in a method performed at an initiator device according to an example, non-limiting embodiment. In this method transaction requests are issued by the initiator device which then determines whether the transaction request has been accepted. If it has not it receives a refused acknowledgement signal and it then determines if the transaction request has been issued a set number of times. This may be simply one time in which case one will jump to the credit grant received box. If it is more than one time, then it determines if the transaction has not been issued the "N" times yet. If not then a counter than counts the number of times it has issued this transaction is incremented and the transaction request will be issued again. This may be after a time delay or it may be immediately. If the transaction request has been issued the required N times then it is issued again with a credit request associated with it. It will then be determined if the transaction request is accepted. If it is then the credit request is not processed by the recipient device and the initiator device simply issues the next transaction request. If the transaction request is not accepted then the transaction request is not reissued but awaits the credit grant.

Once the credit grant has been received then the transaction request is issued with a credit indicator that ensures that it is accepted. In this respect the transaction request that has been refused n times may be issued with this credit indicator or the initiator device may select another transaction request to issue.

It should be noted that the credit grant signal may be a signal transmitted on its own or it may be an indicator associated with a response signal sent to the refused transaction request.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. A recipient device for receiving transaction requests from a plurality of initiator devices via at least one interconnect, said recipient device comprising:
    at least one port for receiving said transaction requests from and for issuing requests and signals to said at least one interconnect;
    acknowledgement signal generation circuitry configured to generate and output a reject acknowledgement signal indicating a request has been received but has not been accepted by said recipient device;
    a buffer for storing accepted and pending transaction requests prior to execution by said recipient device;
    credit generator circuitry, said credit generator circuitry being configured:
    to reserve at least one available storage location in said buffer; and
    to generate a credit grant for an initiator device that sent one of said transaction requests that was not accepted by said recipient device, said credit grant indicating to said initiator device that there is at least one reserved storage location, such that a subsequent transaction request from said initiator device will be accepted by said recipient device.

2. The recipient device according to claim 1, wherein said recipient device is configured to accept a transaction request comprising an indicator indicating that a credit grant received by said initiator transmitting said transaction request is being used and to store said transaction request in one of said at least one reserved storage locations.

3. The recipient device according to claim 2, wherein said credit generator circuitry comprises a counter for storing a count of a number of reserved available storage locations, said credit generator being configured to increment said count value in response to determining one of said storage locations becoming available and to decrement said count value in response to receiving a transaction request comprising an indicator indicating that a received credit grant is being used.

4. The recipient device according to claim 1, said credit generator circuitry further comprising a plurality of counters corresponding to said plurality of initiator devices each for storing a count value indicative of a number of pending transaction requests received from said respective plurality of initiator devices that have not been accepted by said recipient device, said credit generator circuitry being configured to increment one of said counters in response to said recipient device receiving and not accepting at least some of said transaction requests from said corresponding initiator device and to decrement one of said counters in response to receiving a transaction request comprising an indicator indicating that a received credit grant is being used from said corresponding initiator device.

5. The recipient device according to claim 4, wherein said credit generator circuitry is configured to increment one of said counters in response to all of said transaction requests that are received and not accepted by said recipient device.

6. The recipient device according to claim 4, wherein said credit generator circuitry is configured to increment one of said counters only in response to said transaction requests that are received and not accepted by said recipient device and that comprise a credit granting indicator.

7. The recipient device according to claim 4, wherein said credit generator circuitry comprises prioritisation logic for prioritising said pending transaction requests that were not accepted by said recipient device, said prioritisation logic being configured to select said one of said initiator devices to transmit said credit grant to in dependence upon a prioritisation algorithm and upon count values of said counters.

8. The recipient device according to claim 4, wherein said credit generator circuitry is responsive to a credit refuse request received at said at least one port indicating that a credit grant that has been generated and output to one of said initiator devices is not required by said initiator device, to make one of said reserved storage locations available and to decrement said counter related to said one of said initiator devices.

9. The recipient device according to claim 1, wherein said credit generator circuitry is responsive to a credit grant demand received at said at least one port from an initiator device, to determine when a storage location becomes available in said buffer and to reserve an available storage location, and to generate and output a credit grant to said initiator device.

10. A method of determining which transaction requests to accept at a recipient device receiving transaction requests issued by a plurality of initiator devices comprising:
    receiving said transaction requests;
    generating reject acknowledgement signals for transaction requests that are received but not accepted by said recipient device;

storing accepted and pending transaction requests in a buffer prior to execution by said recipient device;

reserving at least one available storage location in said buffer;

generating a credit grant for an initiator device that sent one of said transaction requests that was not accepted by said recipient device;

outputting said credit grant to said initiator device indicating that there is a reserved storage location, such that a subsequent transaction request from said initiator device will be accepted by said recipient device.

11. A recipient means for receiving transaction requests from a plurality of initiator means via at least one interconnect, said recipient means comprising:

at least one port means for receiving said transaction requests from and for issuing requests and signals to said at least one interconnect;

an acknowledgement signal generating means for generating and outputting a reject acknowledgement signal indicating a request has been received but has not been accepted by said recipient means;

a storage means for storing accepted and pending transaction requests prior to execution by said recipient device;

a credit generating means for reserving at least one available storage location in said storage means, and for generating a credit grant for an initiator means that sent one of said transaction requests that was not accepted by said recipient means, said credit grant indicating to said initiator means that there is at least one reserved storage location, such that a subsequent transaction request from said initiator means will be accepted by said recipient means.

* * * * *